March 16, 1926.
G. L. BOWMAN
1,576,714
ANIMAL CONTROL DEVICE
Filed Sept. 19, 1922
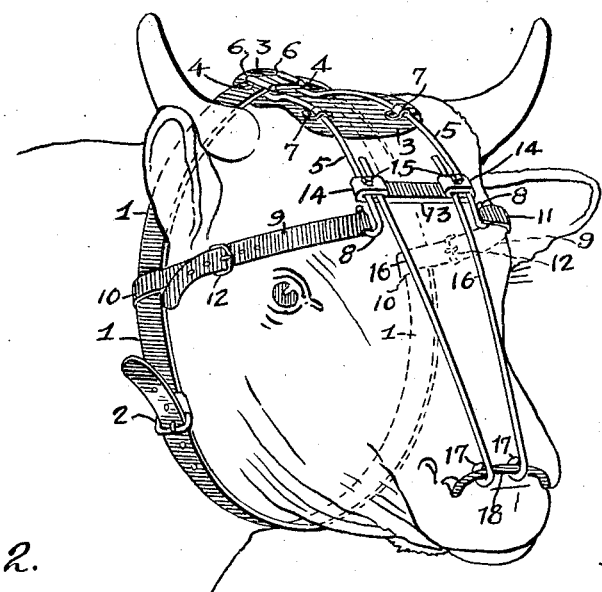
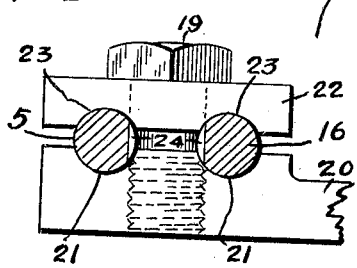
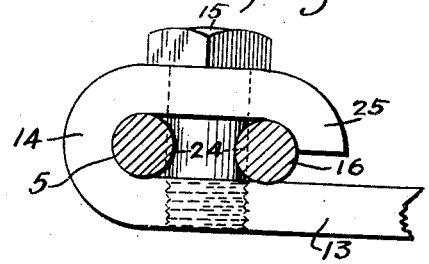
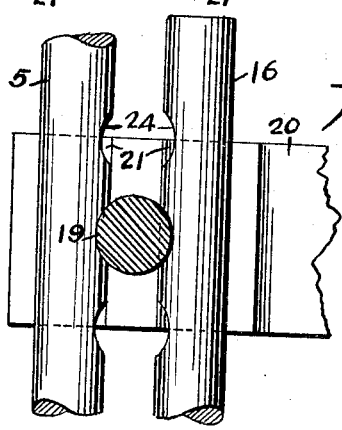

Patented Mar. 16, 1926.

1,576,714

UNITED STATES PATENT OFFICE.

GUSTAF L. BOWMAN, OF VALPARAISO, INDIANA.

ANIMAL-CONTROL DEVICE.

Application filed September 19, 1922. Serial No. 589,172.

*To all whom it may concern:*

Be it known that I, GUSTAF L. BOWMAN, a citizen of the United States, residing at Valparaiso, in the county of Porter and State of Indiana, have invented certain new and useful Improvements in Animal-Control Devices, of which the following is a specification.

My invention relates to improvements in animal control devices and it more especially consists of the features hereinafter pointed out in the annexed claims.

The purpose of my invention is to provide an animal control, also known as an animal poke, that is extremely simple in construction; that is universally adjustable; that is easily attached to the animal and that effectually controls and tames vicious animals so as to remove all risk of danger from vicious animals that cause destruction of life and property.

With these and other purposes in view, I illustrate in the accompanying drawing such instances of adaptation as will disclose the broad underlying features without limiting myself to the specific details shown thereon and described herein.

Figure 1 is a perspective view of my device placed on the head of an animal.

Fig. 2 is a detached and enlarged elevation of the frame adjusting means partly in section.

Fig. 3 is a plan view of Fig. 2.

Fig. 4 is an alternative construction to that shown in Fig. 2.

In practically carrying out my invention, I provide a leather or other neck band 1 which is made adjustable by any well known type of buckle arrangement 2. This admits of adjusting the neck band to different sized animals. On top of the head of the animal a pad 3 formed of leather or other material is secured, at 4, underneath the neck band 1 by rivets. It may also be secured to the neck band by sewing or otherwise. This pad on its upper face has retaining loops 7 through which curved metallic or other stiff members 5 pass. These members at their upper end terminate in elongated eyes 6 through which the neck band 1 passes, and the lower end of the curved members 5 terminate in elongated eyes 8 to which side straps 9 are attached, by means of loops 11. These straps are slidable on the neck band by means of a loop 10, and they are adjustable by any well known buckles 12. The straps 9 serve to hold the control device directly over the center of the animal's forehead and prevent it slipping sideways.

Between the loops 7 and the eyes 8, a distance bar 13 is placed. This bar serves to keep the members 5 spaced apart and also serves to hold the same in adjustable relation thereon. In addition, the member 13 holds the upper end of the curved rods 16 spaced apart and in adjustable relation to the members 5. Each end of the flat bar 13 may be bent over at 14, as shown in Fig. 4, so as to form a return bend 25. One of the rods 16 and one of the members 5 pass between the bar 13 and the bent over portion 25 where they are held by a clamping screw 15 that passes between them, as shown in Fig. 4. The other end of the bar 13 similarly holds the other rod 16 and member 5 in adjustable relation. At the lower end of the rods 16, eyes 17 are formed through which the nose ring 18 passes.

The modified bar 20, shown in Fig. 2, has a pair of transverse grooves 21 formed in each end thereof. Caps 22 have similar grooves 23 formed on the underside thereof. Clamping screws 19 hold the caps 22 on the bar 20 so as to clamp rods 16 and members 5 in the grooves 21 and 23. In order that the rod 16 and members 5 may still further be held against endwise movement notches 24 may be formed on their edges. These serve to cooperate with the clamping screw 19, as shown in Fig. 3.

The device is placed on the animal's head and adjusted by set screws 15 or 19 so that the nose ring 18 will be in its raised position. In this way it is found that vicious domestic animals are quickly tamed and are brought under complete control. The rods 16 and members 5 may be round or flat or any other desired shape in cross section. Since there are but a very few parts, the device is not easily disarranged, in consequence of which it remains effective to the highest degree making it possible to permit male animals to run loose in dairy or other herds without incurring any risks whatever of being injured by such animals should they develop vicious propensities.

The use of my device does not hinder the animal in grazing, drinking or feeding, in fact the control need not be removed at all. The use of my device does not in any way inflict punishment on the animal. It sets squarely on the top of the head and when properly adjusted projects above the head and also about two inches in front of the head in such a manner as to hold the nose ring straight out from the nostrils where the rods are attached. Any attempt that the animal may make to butt will put a stress on the rods and the ring so as to cause pain when any object is engaged. In this way the animal is tamed. I have many practical demonstrations of actual use which clearly show the effectiveness of my device in actually curbing or taming the butting instincts of the most vicious animals.

What I claim is:

1. In animal control devices, a suitable neckband, a permanently attached pain inflicting nose ring, a pair of curved metallic members slidable on the neck band, a second pair of curved metallic members slidable on the nose ring, a spacing bar, means for adjustably holding the curved members on such bar, adjustable means cooperating with the spacing bar adapted to hold the device approximately central of the animal's forehead, and a pad secured to the neckband and beneath the upper curved members.

2. In animal control devices, a suitable neck band, a pain inflecting nose attachment, a pair of bent metallic members slidable on the neck band and terminating near the forehead, a pair of rods slidable on the nose attachment and passing from the same toward the forehead members, a distance bar in common for the rods and the members, means on such bar for holding the rods and members in adjustable relation to each other, and means for holding the distance bar in adjustable spaced relation to the neck band.

3. In animal control devices, a suitable neckband, a pain inflicting nose ring, separate curved connecting members passing over the animal's forehead attached to the neckband and the nose ring, means for adjustably holding the free ends of such connecting members in spaced apart relation, arbitrarily placed self-positioning notches formed on the free ends of the curved connectors, fastening bolts passing between adjacent members, and a cross bar in which the parts are held for adjustment.

4. In animal control devices, an adjustable neckband, a permanently attached nose ring, a pair of curved members projecting upwards from and slidably attached to the nose ring, a pair of curved members slidably attached to the neckband and passing downward over the animal's forehead terminating adjacent the ends of the nose ring members, and means for adjustably holding the free ends of the two sets of curved members in spaced apart and adjustable relation to each other.

5. In animal control devices, a suitable neckband, a pair of curved members slidable on the band, a pad beneath the members and the band, said pad being secured to the band on each side of the members, means for holding the outer portion of the pad to the members, means for adjustably connecting the lower ends of the members to the sides of the neckband so that the latter means would slide on the neckband, a pair of curved rods whose lower ends terminate in eyes, a pain inflicting nose attachment slidable in said eyes, a distance bar for holding the pair of rods in spaced relation to the pair of the head members, and means for adjustably clamping the rods and the members on said bar.

6. In animal control devices, a suitable neckband, a pain inflecting nose attachment, a pair of nose rods slidable on the nose attachment, a pair of head members secured to the neckband, means for holding the rods and members in spaced and adjustable relation to each other, and means for holding the nose rods and head members in spaced relation to the neck band at a point above the nose attachment.

7. In animal control devices, separate curved members passing over the animal's forehead, a nose ring slidably attached at the lower end, an adjustable neck band slidably attached at the upper end, adjustable fastening means for simultaneously holding the free ends of the adjacently positioned members against sidewise displacement, and clamping means passing between the adjacently positioned free ends.

8. In animal control devices, a neckband, a nose ring, a two-part curved member connecting the neckband and nose ring, means located on the animal's forehead having limiting abutments to position the curved members in side by side relation, and clamping means passing between the adjacent ends of the two-part curved member.

In testimony whereof I affix my signature.

GUSTAF L. BOWMAN.